(12) United States Patent
Hoshino et al.

(10) Patent No.: US 7,424,519 B2
(45) Date of Patent: Sep. 9, 2008

(54) DISTRIBUTED STORAGE SYSTEM, STORAGE DEVICE AND METHOD OF COPYING DATA

(75) Inventors: Kazuyoshi Hoshino, Komae (JP); Hiroaki Odawara, Kodaira (JP)

(73) Assignee: Hitachi, Ltd., Tokyo (JP)

(*) Notice: Subject to any disclaimer, the term of this patent is extended or adjusted under 35 U.S.C. 154(b) by 617 days.

(21) Appl. No.: 10/194,316

(22) Filed: Jul. 15, 2002

(65) Prior Publication Data

US 2003/0131068 A1 Jul. 10, 2003

(30) Foreign Application Priority Data

Jan. 10, 2002 (JP) ............................. 2002-002937

(51) Int. Cl.
*G06F 15/167* (2006.01)
*G06F 15/173* (2006.01)
*G06F 12/00* (2006.01)

(52) U.S. Cl. .................. 709/212; 709/217; 709/223; 709/226; 707/202; 707/204

(58) Field of Classification Search ......... 709/201–237; 711/112, 162; 707/8, 202–204; 714/769
See application file for complete search history.

(56) References Cited

U.S. PATENT DOCUMENTS

| | | | | |
|---|---|---|---|---|
| 5,966,730 | A * | 10/1999 | Zulch | 711/162 |
| 6,101,497 | A * | 8/2000 | Ofek | 707/10 |
| 6,108,300 | A * | 8/2000 | Coile et al. | 370/217 |
| 6,356,977 | B2 * | 3/2002 | Ofek et al. | 711/112 |
| 6,785,678 | B2 * | 8/2004 | Price | 707/8 |
| 6,810,396 | B1 * | 10/2004 | Blumenau et al. | 707/5 |
| 6,845,395 | B1 * | 1/2005 | Blumenau et al. | 709/223 |
| 6,871,296 | B2 * | 3/2005 | Kashyap | 714/13 |
| 2001/0020254 | A1 * | 9/2001 | Blumenau et al. | 709/229 |
| 2001/0056438 | A1 * | 12/2001 | Ito | 707/204 |
| 2002/0161845 | A1 * | 10/2002 | Odenwald et al. | 709/209 |
| 2002/0176430 | A1 * | 11/2002 | Sangha et al. | 370/412 |
| 2003/0084076 | A1 * | 5/2003 | Sekiguchi et al. | 707/205 |

(Continued)

FOREIGN PATENT DOCUMENTS

JP 11-24846 7/1997

OTHER PUBLICATIONS

Tierney et al., A nework-Aware distributed storage cache for data intensive environments, High performance distributed computing, 1999, proceedings, The eighth international symposium on Aug. 3-6, 1999, pp. 185-193.*

*Primary Examiner*—Patrice L. Winder
*Assistant Examiner*—Michael D Meucci
(74) *Attorney, Agent, or Firm*—Reed Smith LLP; Stanley P. Fisher, Esq.; Juan Carlos A. Marquez, Esq.

(57) ABSTRACT

At least three storage devices are connected via a network to each other. Backup data is concurrently transferred from one of the storage devices, i.e., from a copy source storage device to other ones thereof, i.e., to copy destination storage devices. The amount of data transferred from the copy source storage device to each copy destination storage device is dynamically changed according to a state of a communication connection therebetween. At occurrence of a failure in the copy source storage device, necessary data can be concurrently read from the backup storage devices to restore the data in the copy source storage device at a high speed.

23 Claims, 19 Drawing Sheets

U.S. PATENT DOCUMENTS

2003/0120723 A1* 6/2003 Bright et al. ................ 709/203
2003/0126200 A1* 7/2003 Wolff ......................... 709/203
2003/0126282 A1* 7/2003 Sarkar et al. ................ 709/237
2005/0055444 A1* 3/2005 Venkatsubramanian ..... 709/225
2005/0172093 A1* 8/2005 Jain ........................... 711/162

* cited by examiner

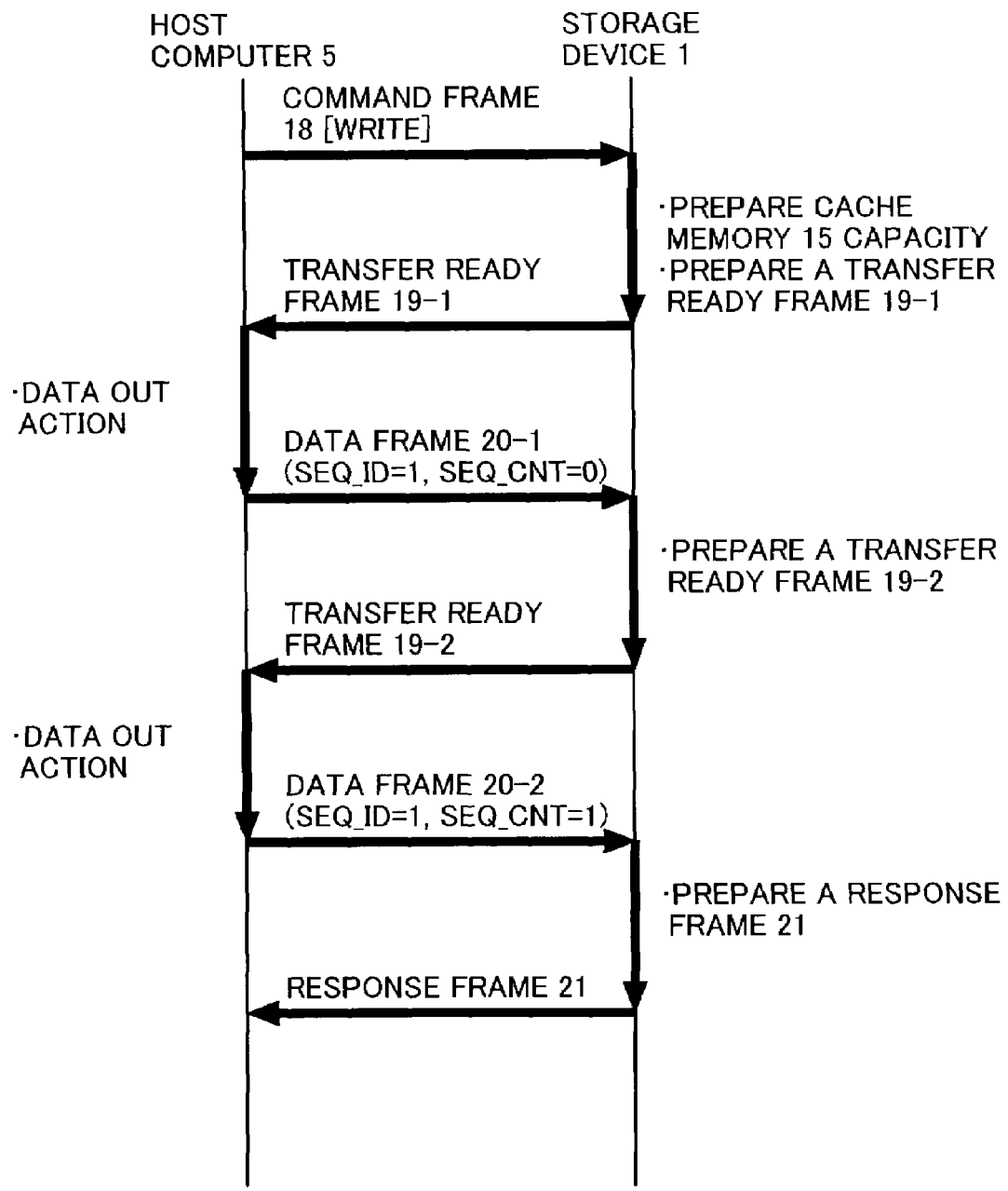

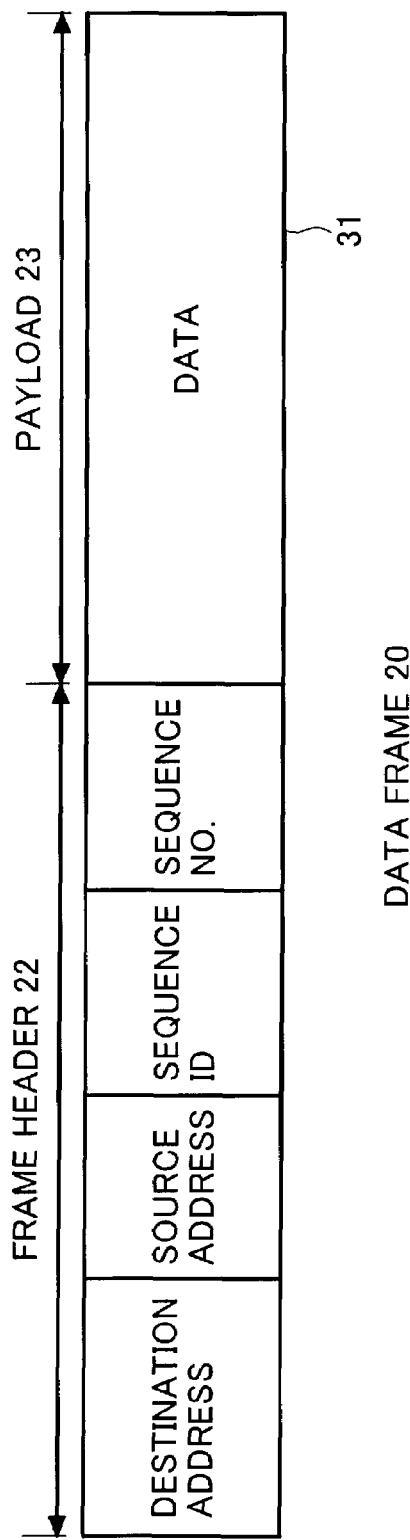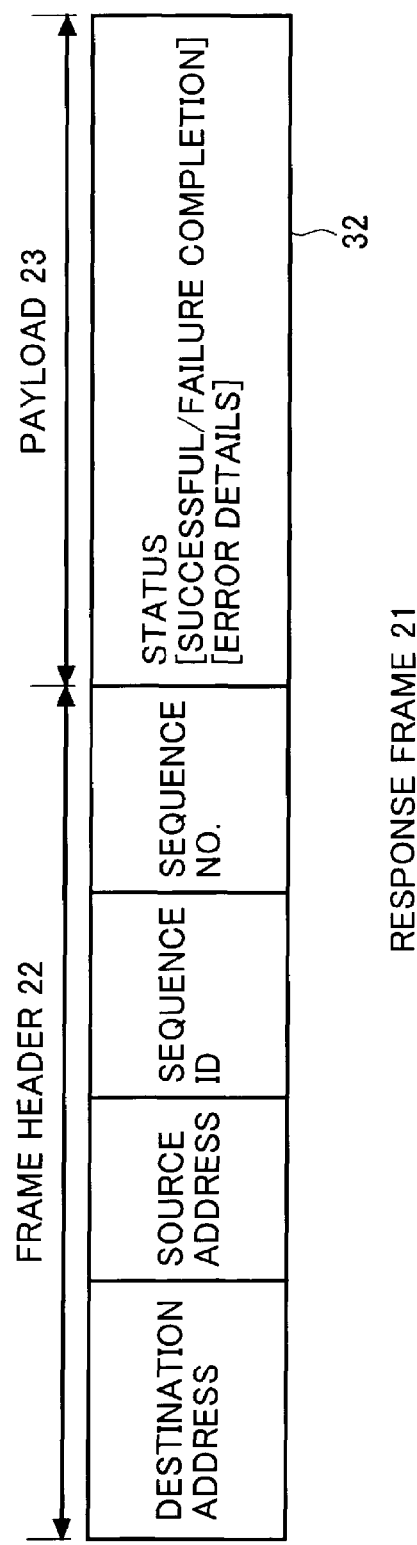

FIG.6

| | REMOTE DEVICE ID | LOGICAL UNIT NUMBER | LOGICAL ADDRESS | DATA LENGTH | TIME STAMP |
|---|---|---|---|---|---|
| ENTRY 1 | ID=2 | LUN=1 | LA=1 | L=2 | TS=0 |
| ENTRY 2 | ID=3 | LUN=1 | LA=3 | L=3 | TS=1 |
| | . . | . . | . . | . . | . . |
| ENTRY N | | | | | |

| | REMOTE DEVICE ID | LOGICAL UNIT NUMBER | LOGICAL ADDRESS | DATA LENGTH | TIME STAMP |
|---|---|---|---|---|---|
| ENTRY 1 | ID=1 | LUN=1 | LA=1 | L=2 | TS=0 |
| ENTRY 2 | | | | | |
| | . . | . . | . . | . . | . . |
| ENTRY M | | | | | |

43-1
REMOTE STORAGE DEVICE ID=2

FIG.7B

| | REMOTE DEVICE ID | LOGICAL UNIT NUMBER | LOGICAL ADDRESS | DATA LENGTH | TIME STAMP |
|---|---|---|---|---|---|
| ENTRY 1 | ID=1 | LUN=1 | LA=3 | L=3 | TS=1 |
| ENTRY 2 | | | | | |
| | . . | . . | . . | . . | . . |
| ENTRY L | | | | | |

43-2
REMOTE STORAGE DEVICE ID=3

FIG.17

|  | LOGICAL UNIT NUMBER | LOGICAL ADDRESS | DATA LENGTH | TIME STAMP |
|---|---|---|---|---|
| ENTRY 1 |  |  |  |  |
| ENTRY 2 |  |  |  |  |
|  | ⋮ | ⋮ | ⋮ | ⋮ |
| ENTRY N |  |  |  |  |

44

DISTRIBUTED STORAGE SYSTEM, STORAGE DEVICE AND METHOD OF COPYING DATA

BACKGROUND OF THE INVENTION

The present invention relates to a data storage, and in particular, to a distributed storage and a system using the same.

While an electronic commerce system and a data center are being constructed for practices, it is desired for a system to protect important data such as information of customers and commercial contents even in local disaster or catastrophe caused by, for example, an earthquake, a fire, and a power failure.

To protect data, a method called "redundant array of independent disks (RAID)" or "remote copy" has been heretofore employed. The RAID system is classified into RAID-0 to RAID-5. To protect data at a disk failure, RAID-0 and RAID-5 are mainly used at present.

In the RAID-1, the data to be protected is written on a current disk and another or backup disk. Even if the current disk fails, the data thereon is also written on the backup disk. It is therefore possible to prevent loss of data.

In the RAID-5 system, record data divided into blocks and parity of the record data are distributed to be recorded on a plurality of disks.

When one of the disks fails in the RAID-5 system, the record data on the disk can be restored using associated data and data parity stored on other normal disks. Also, since data can be distributively written on or read from the disks in a concurrent fashion in the RAID-5 system, the disk access speed is increased when compared with a disk access operation using one disk.

A remote copy method is used to produce a replica or copy of data at a physically remote location using a network. The remote copy is achieved, for example, in a configuration in which servers are coupled via a network with each other or a configuration in which storage subsystems are coupled via a network with each other. In this case, a leased communication line with guaranteed communication quality is primarily employed as the network for the remote copy.

SUMMARY OF THE INVENTION

The RAID system is commonly used to protect data. However, the data is protected between the disks belonging to the servers or within a storage subsystem linked with servers via a storage area network (SAN). Therefore, data cannot be protected in the local disaster. For the remote copy to protect data in the local disaster, a leased line is used in general. However, a high communication cost is required for the leased line. Therefore, a considerably high cost is required to backup a large amount of data.

A relatively inexpensive network such as internet can be used for the remote copy. However, when such a network with non-guaranteed communication quality is used, the backup system is possibly disabled by deteriorated communication quality (by a decreased communication speed) in some cases. Therefore, a system or a method to overcome this difficulty is required.

According to one aspect of the present invention, at least three storage devices are connected via a network to each other. From one copy source storage device, backup data is concurrently transferred to a plurality of copy destination storage devices to thereby implement high-speed backup.

When a inexpensive network of which communication quality continuously changes is used, an amount of data transferred from the copy source storage device to each of the copy destination storage devices is dynamically changed according to a state of communication connection therebetween. This resultantly prevents the situation in which the data backup is disabled by deterioration in the communication state of particular communication connection. When a leased line with a guaranteed communication speed is used, the backup speed can be further increased.

When the copy source storage device fails, data can be concurrently read from the backup destination storage devices to thereby restore the data at a high speed.

According to an embodiment of the present invention, there is implemented a data copy method in which a plurality of storage devices are mutually connected via a network to each other such that a copy of data in a source storage device is produced in a plurality of storage devices other than the source storage device. According to a state of communication connection of the network, storage devices are selected to generate thereof a copy of data from a storage device. In the operation, the state of communication connection of the network can be determined using a packet monitoring the network state. Each storage device includes a data input buffer to transmit a data frame for each communication connection to the other storage devices. The storage device can therefore determine the state of communication connection of the network according to a state of the data input buffer. Specifically, there may be used various modes such as a mode in which data is preferentially sent to a buffer having a larger unused area and a mode in which data is preferentially sent to a buffer having a higher transmission rate.

According to another embodiment of the present invention, there is implemented a distributed storage system in which a host computer is connected via a network to a plurality of storage devices. According to a state of communication connection of the network, storage devices to be accessed by the host computer is dynamically selected.

According to still another embodiment of the present invention, there is implemented a storage device connected via a network to other storage devices to communication to each other. According to a state of communication connection of the network, the storage device dynamically selects another storage device to be accessed.

Other objects, features and advantages of the invention will become apparent from the following description of the embodiments of the invention taken in conjunction with the accompanying drawings.

BRIEF DESCRIPTION OF THE DRAWINGS

FIG. 3 is a flowchart showing a procedure to write data from a host computer to a storage device.

FIGS. 4A to 4D are diagrams showing layouts of frames used to transfer data.

FIG. 6 is a diagram showing a local management table.

FIGS. 7A and 7B are diagrams showing remote management tables.

FIG. 17 is a diagram showing a configuration of a failure data table.

DESCRIPTION OF THE EMBODIMENTS

Figure 1:
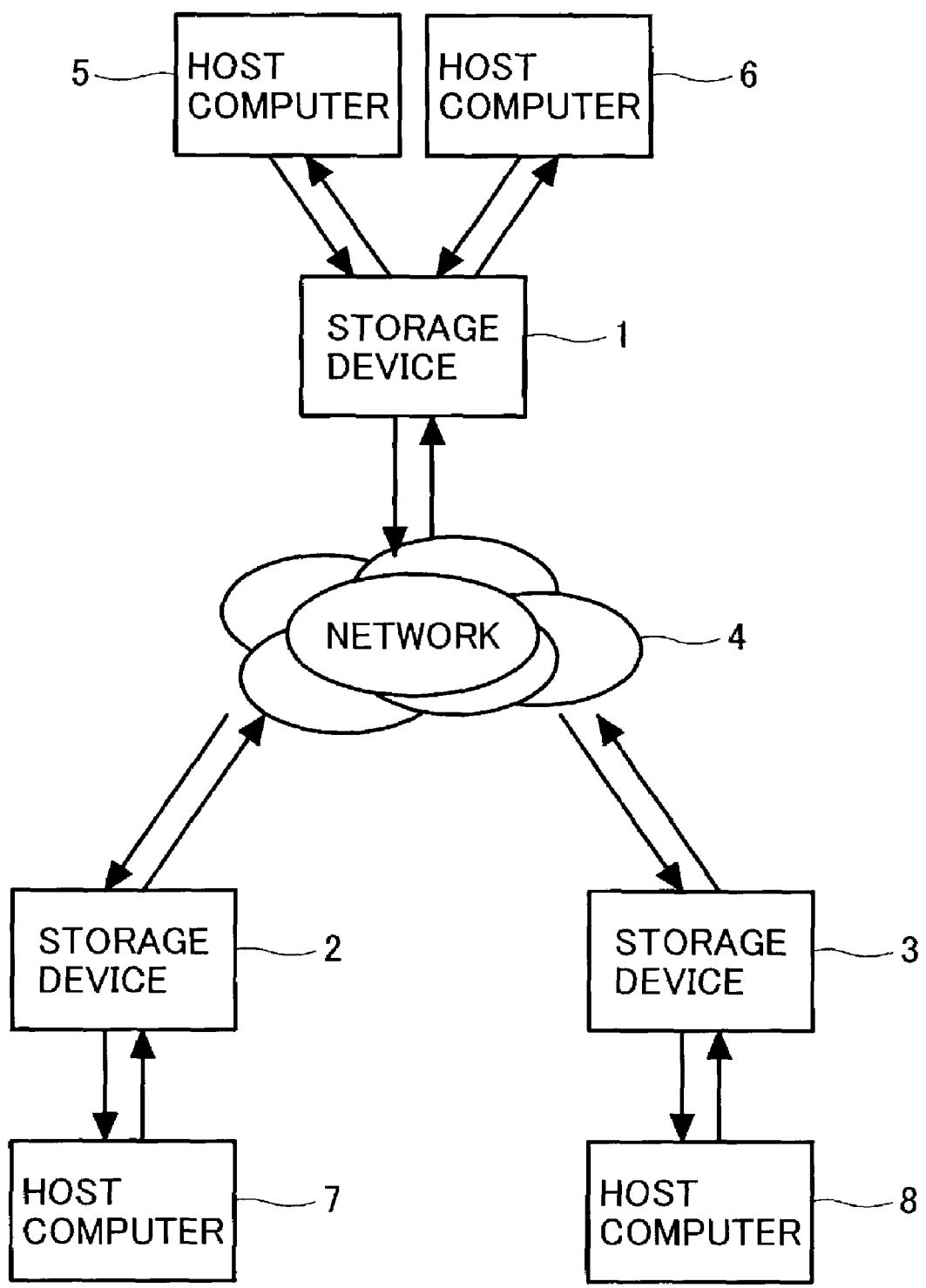
FIG. 1 is a diagram showing a configuration of a distributed storage system.

Description will now be given of an embodiment of the present invention by referring to the drawings.

FIG. 1 shows the overall configuration of a distributed storage system according to the present invention.

The configuration is an example of a distributed storage system including three storage devices 1 to 3 mutually connected via a network 4 to each other and four host computers 5 to 8 connected to the storage devices 1 to 3 as shown in FIG. 1. The storage devices 1 to 3 can be directly connected to the host computers 5 to 8 using a cable or an optical fiber or using storage area network (SAN). It is also possible to configure the system such that the host computers 5 to 8 includes the storage devices 1 to 3 and the host computers 5 to 8 are connected to the storage devices 1 to 3 using an internal bus.

Figure 2:
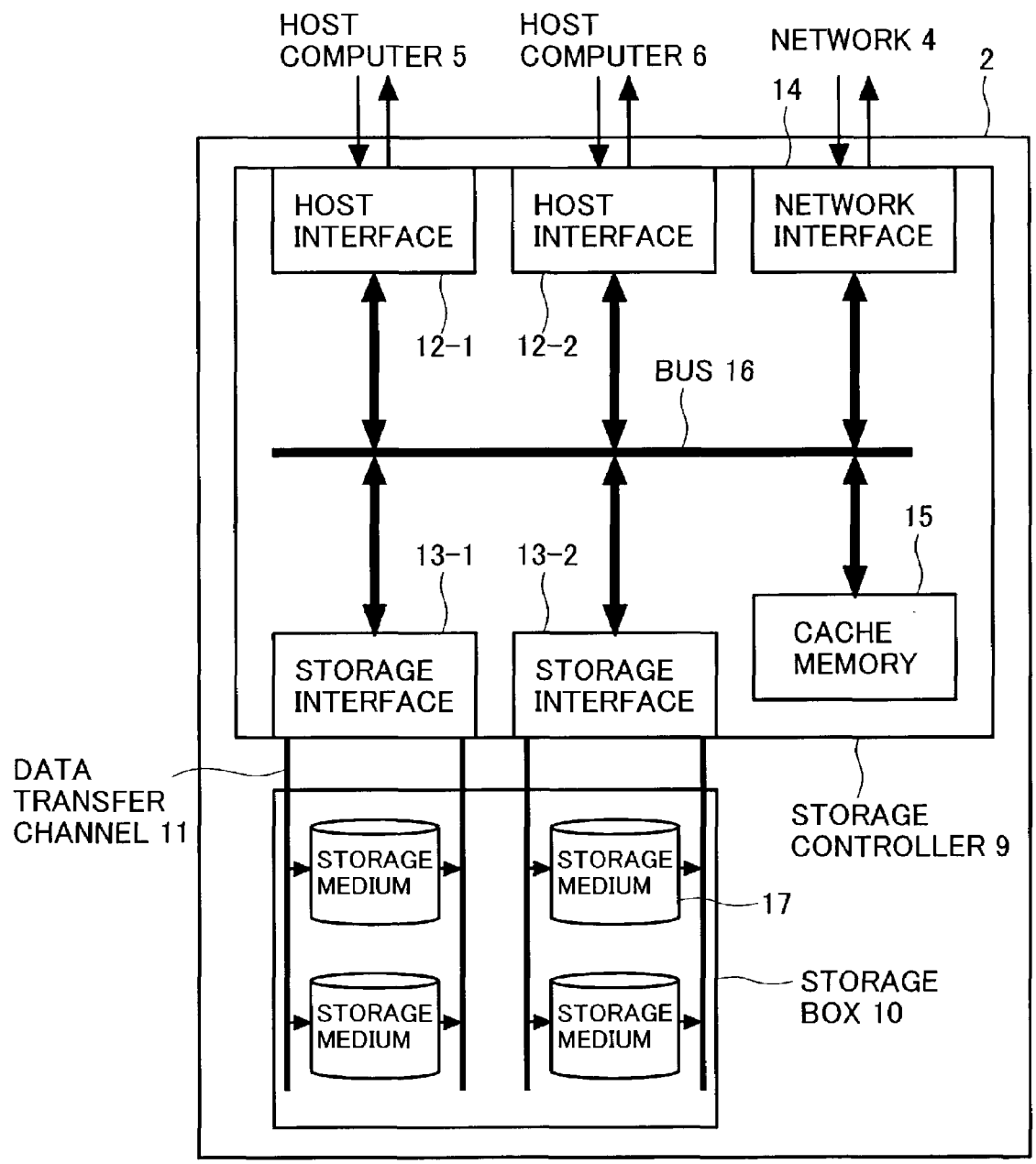
FIG. 2 is a block diagram showing a configuration of a storage device.

FIG. 2 shows an example of a configuration of the storage device 1. In the system, the storage devices 2 and 3 may be configured in the same way as for the storage device 1. The storage device 1 includes a storage controller 9 and a storage box 10. The storage controller 9 is connected via a data transfer channel 11.

The storage device 1 is connected via two host interfaces 12-1 and 12-2 respectively to the host computers 5 and 6 and is connected via two storage interfaces 13-1 and 13-2 to the storage box 10. The storage device 1 is mutually connected via a network interface 14 and a network 4 to the storage devices 2 and 3. The cache memory 15 is used to write data in the storage device 10 and to temporarily store readout data therein. The host interfaces 12, the storage interfaces 13, network interface 14, and the cache memory 15 are mutually connected via an internal bus 16 in the storage controller 9.

Each of the host computers 5 and 6 issues, in response to a request from a process such as an operating system or an application, an access instruction or command via the host interface 12 to the storage controller 9. The controller 9 controls via the storage interface 13 a recording medium 17 of the storage device 10 according to the access command from the host computer 5 or 6 to achieve a data write or read operation.

FIG. 3 shows an example of a data write procedure between the host computer 5 and the storage device 1. The host computer 5 issues a data write command frame 18 to the storage device 1.

FIG. 4 shows an example of each frame used for the data transfer operation of FIG. 3.

Figure 4A:
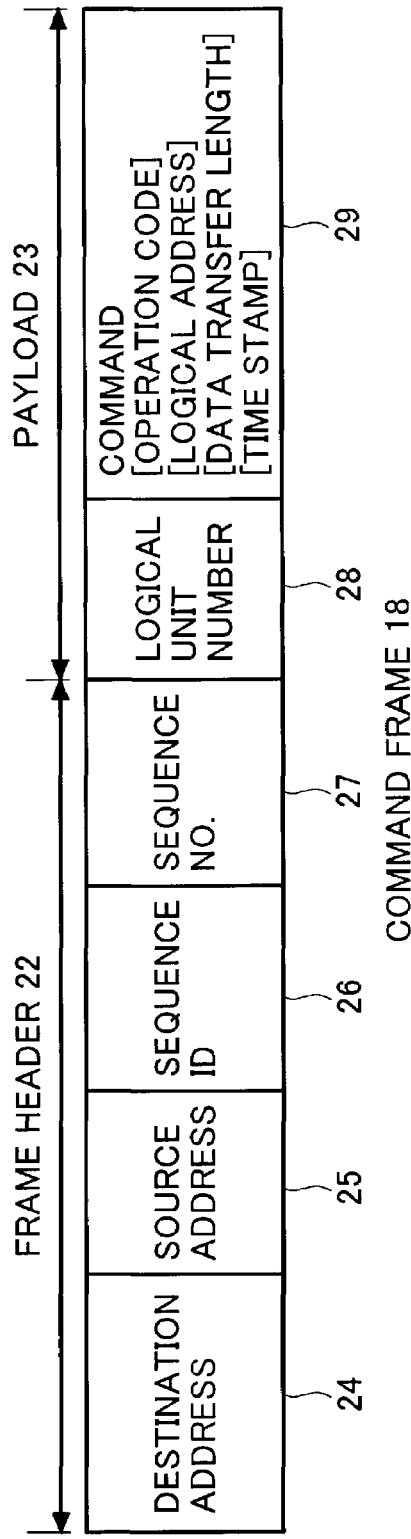
Figure 4B:
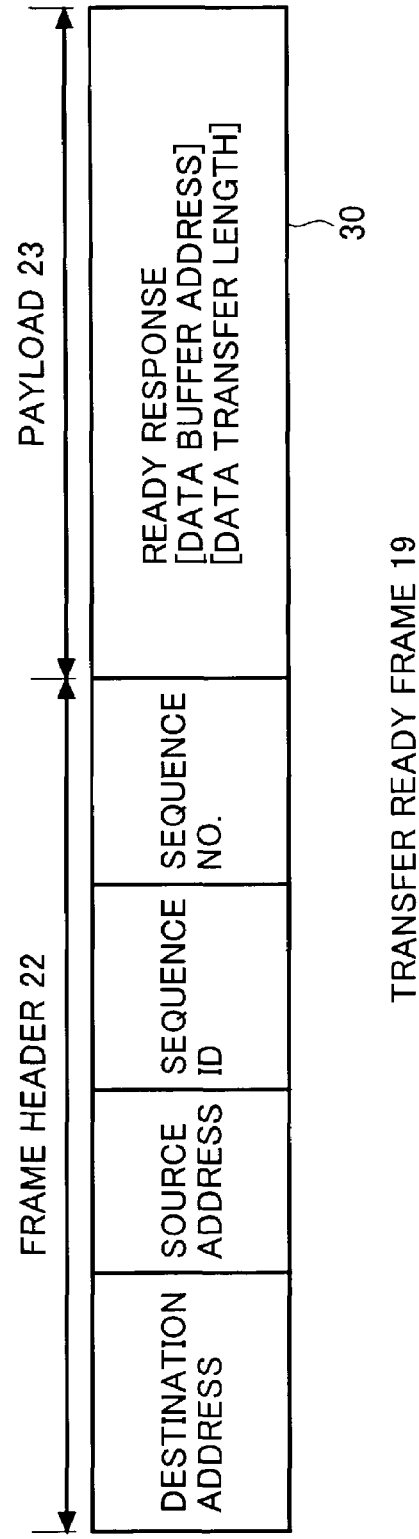

First, the host computer 5 issues a data write command frame 18 (FIG. 4A) to the storage device 1 to instruct a data write operation. In the operation, a command of the command frame 18 from a transmission source storage device to a destination storage device is written as a command operation code in a command field 29 (FIG. 4A).

The host interface 12-1 reserves a data receiving area in the cache memory 15 according to information of transfer data in a the command field 29 of the command frame 18 and then sends a transfer ready frame 19 (FIG. 4B) to the host computer. Having received the frame 19, the host computer 5 outputs a data frame 20 (FIG. 4C) to the storage device 1. The host interface 12 writes the data from the host computer 5 via the bus 16 in the cache memory 15 and sends the transfer ready frame 19 to the host computer to request transfer of a next data frame 19. If the received data frame is a last data frame 19 or if a reception error occurs, the host interface 12 sends to the host computer 5 a response frame 21 (FIG. 4D) indicating a reception status to thereby terminate the data write transfer. The host interface 12 also sends to the storage interface 13 and the network interface 12 information such as a logical unit number 28 of the write data, such contents of the command 29 as a logical address, a data transfer length, a timestamp indicating data write time, and a data storage area address in the cache memory 15. In this connection, a frame header 22 of each frame contains a sequence identifier 26 to identify a transfer sequence of each data, a sequence number 27 indicating an order of the frame in the sequence, and a destination address 24 and a source address 25 to respectively identify a host computer 5 and a storage device 1 respectively as a transmission destination and a transmission source. The address layout varies according to the network to connect the host computer 5 to the storage device 6. For example, when a fiber channel is used as the network, the identifiers are set to the destination and source addresses 24 and 25. When the network is Ethernet, a trademark of Fuji-Xerox, MAC addresses are set thereto. When the network is an IP network of layer 3, IP addresses are set thereto.

According to the notification from the host interface 12, the storage interface 13 converts the logical unit number 18 into a physical unit number of the storage medium 17, converts a logical address of the storage medium 17 into a physical address thereof, and read data via the bus 16 from the cache memory 15. Finally, the storage interface 13 writes data via the data transfer channel 11 on the storage medium 17.

According to the instruction from the host interface 12, the network interface 14 copies write data received via the network 4 from the host computer 5 distributively onto the storage devices 2 and 3 of the distributed storage system. The copy can be used as backup data.

Figure 5:
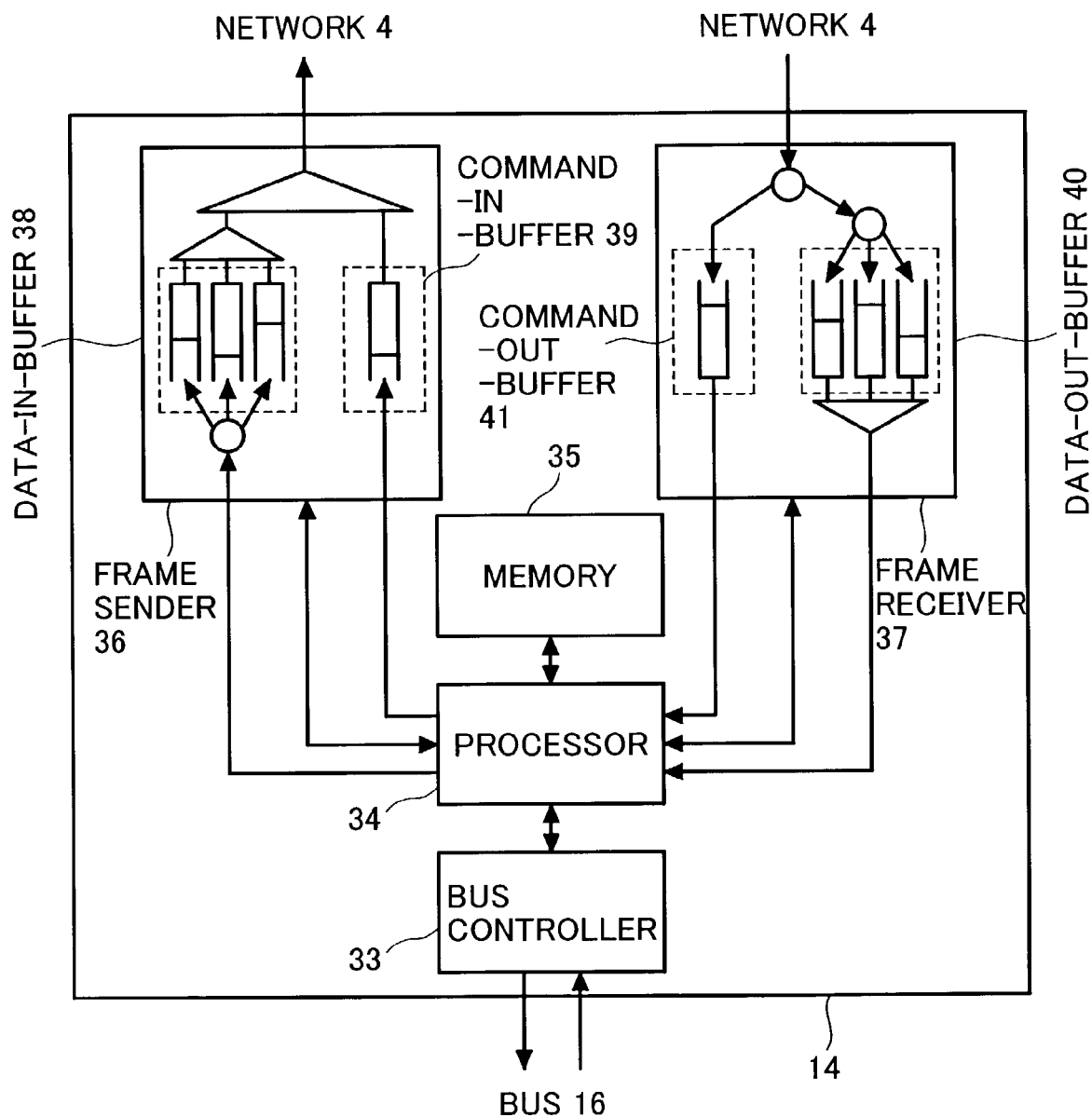
FIG. 5 is a diagram showing a configuration of a network interface.

FIG. 5 shows an example of the configuration of the network interface 14. The configuration of the interface 14 shown in FIG. 5 includes a bus controller 33, a processor 34, a memory 35, a frame sender 36, and a frame receiver 37. The bus controller 33 arbitrates the bus 16 to communicate data via the bus 16 with other constituent components of the storage controller 9. The processor 34 conducts processing for communication connections to the storage devices 2 and 3 of the distributed storage system. For example, the processor 34 sets, maintains, and manages the communication connections as well as controls data transfer flows and determines the data transmission destination. The memory 35 stores programs to be executed by the processor 34, a local management table 42 to manage data transferred to the storage devices 2 and 3 of the distributed storage system, and a remote management table 43 to manage data transferred from the storage devices of the distributed storage system. The memory 35 also stores a failure data table 44 to restore erroneous data at occurrence of a failure. The frame sender 36 includes a data-in-buffer 38 to send a data frame for each communication connection for the storage devices 2 and 3 of the distributed storage system and a command-in-buffer 39 to transmit a command frame 18 or a control frame such as "TCP Ack frame" of a data transfer flow. The frame receiver 37 also a data-out-buffer 40 to receive a data frame for each communication connection for the storage devices 2 and 3 of the distributed storage system and a command-in-buffer 39 to receive a command frame 18 or a control frame of a data transfer flow.

FIG. 6 shows a configuration example of the local management table and FIG. 7 shows a configuration example of the remote management table 43.

In the description, it is assumed as an example of a starting procedure of the storage device 1 that the device 1 is started as a constituent component of a distributed storage system including the storage devices 2 and 3. First, the storage device 1 notifies the storage devices 2 and 3 of the distributed storage system that the device 1 starts operating as "a storage device 1" of the distributed storage system. Having received the notification, each of the storage devices 2 and 3 registers the storage device 1 having issued the notification as a constituent component of the distributed storage system and then returns a reply of completion of the registration to the storage device 1. On receiving the reply, the device 1 confirms the storage devices 2 and 3 effectively operating in the distributed storage system and communicates data with the storage devices 2 and 3 having sent the reply to the device 1. In this connection, the notification-reply processing may be periodically executed at a fixed interval of time to confirm that the storage devices 2 and 3 are normally operating in the distributed storage system.

To obtain addresses of the storage devices 2 and 3 to which the notification is to be sent, the storage device 1 may use a method in which the system manager beforehand establishes a notification destination list or a method in which an enquiry is sent to a representative server to which the notification destination list is beforehand registered. If the network 4 mutually connected the storage devices 1 to 3 to each other supports a multicast or broadcast operation, the notification can be multicasted or broadcasted without paying attention to the notification destinations.

To establish communication connections between the storage devices 1 to 3 of the distributed storage system, there may be used a method to fixedly set and maintain the communication connection such as a permanent virtual connection (PVC) in an asynchronous transfer mode (ATM) network or a method in which each communication connection is dynamically set when a data transfer is started and the connection is disconnected when the data transfer is completed, for example, a transmission control protocol (TCP) connection in an internet protocol (IP) network.

Description will now be given of a data copy operation in a case in which the network 4 to mutually connect the storage devices 1 to 3 to each other in the distributed storage system is an IP network associated with the internet and data transfer flows or packet transfer flows are controlled by a TCP between the storage devices 1 to 3.

In the description, a storage device as a data copy source is called a local storage device and a storage device as a data copy destination is called a remote storage device hereinbelow. Data written from the host computer in the local storage device is called original data and data written from the local storage device in the remote storage device is called replica data.

FIGS. 8 to 12 show, as an example of the data copy operation from the local storage device to the remote storage device, a copy operation to copy data from the storage device 1 onto the storage device 2.

FIGS. 8 to 11 show an operation example of the network interface 14 of the storage device 1 at transmission of data in flowcharts.

Figure 8:
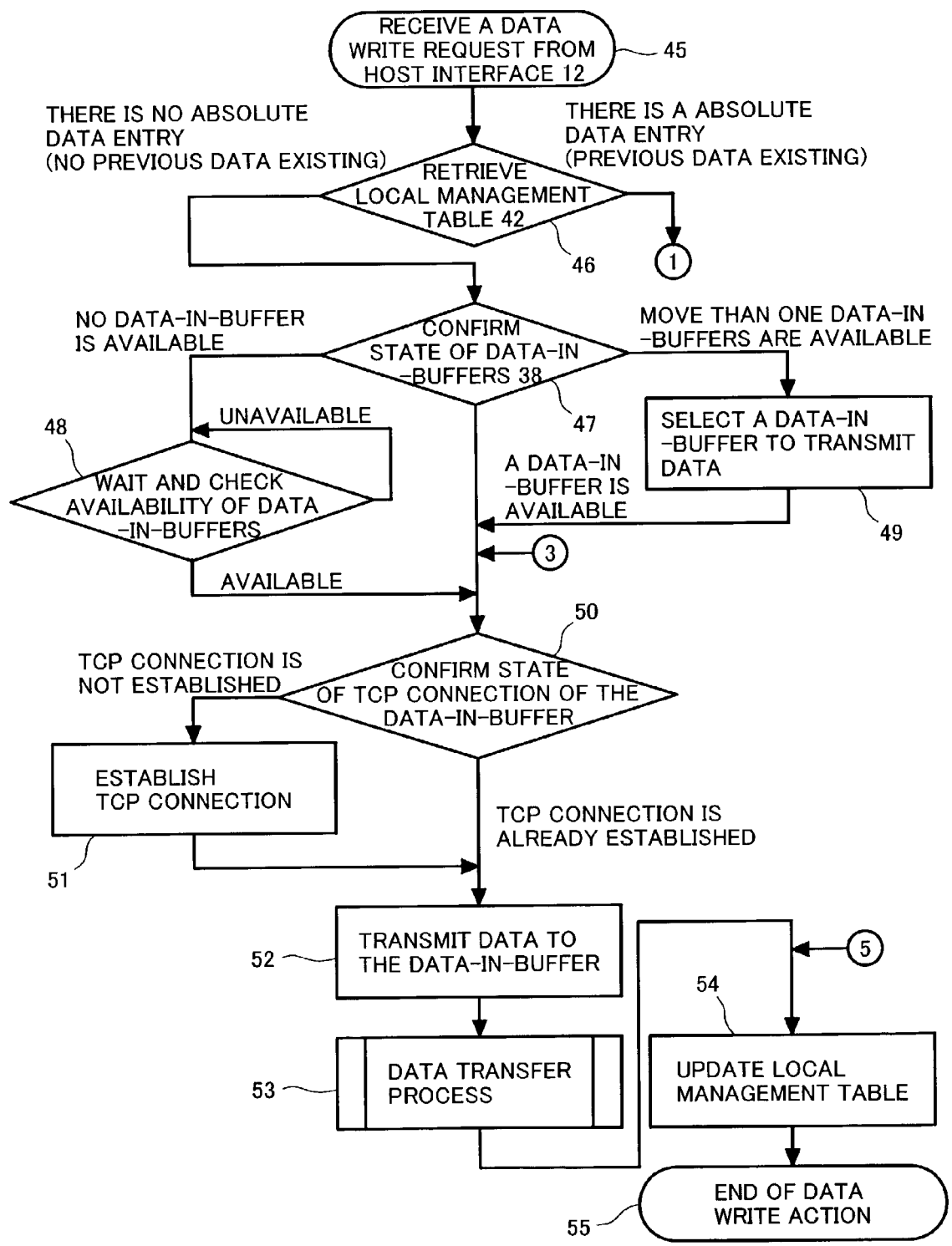
FIG. 8 is a flowchart (1) showing operation of a local interface to write data.

As shown in FIG. 8, in the data write operation from the host computer 5 or 6, the host interface 12 notifies to the network interface 14 such items as a logical unit number, a logical address, and a data transfer length of write data, a time stamp indicating data write time, and a data storage area address on the cache memory 15.

Having received the notification, the processor 34 makes a search through the local management table 42 to determine whether or not an entry of the logical unit number and the logical address of the notified data exists in the local management table 42 (46). If the entry is absent, the processor 34 confirms a state of each data-in-buffer 38 (47) to detect a data-in-buffer 38 available for data transmission. For example, if data transmission is impossible from any data-in-buffer 38 because of another data write operation, the processor 34 waits for a state in which the data write operation is finished and hence a data-in-buffer 38 becomes available ($( ). When a plurality of data-in-buffers are detected for data transmission, a data-in-buffer 38 is selected for transmission according to a predetermined procedure, for example, a round-robin procedure, a random procedure, or a procedure to preferentially use a data-in-buffer 38 with a smaller amount of total transfer data (49).

Figure 9:
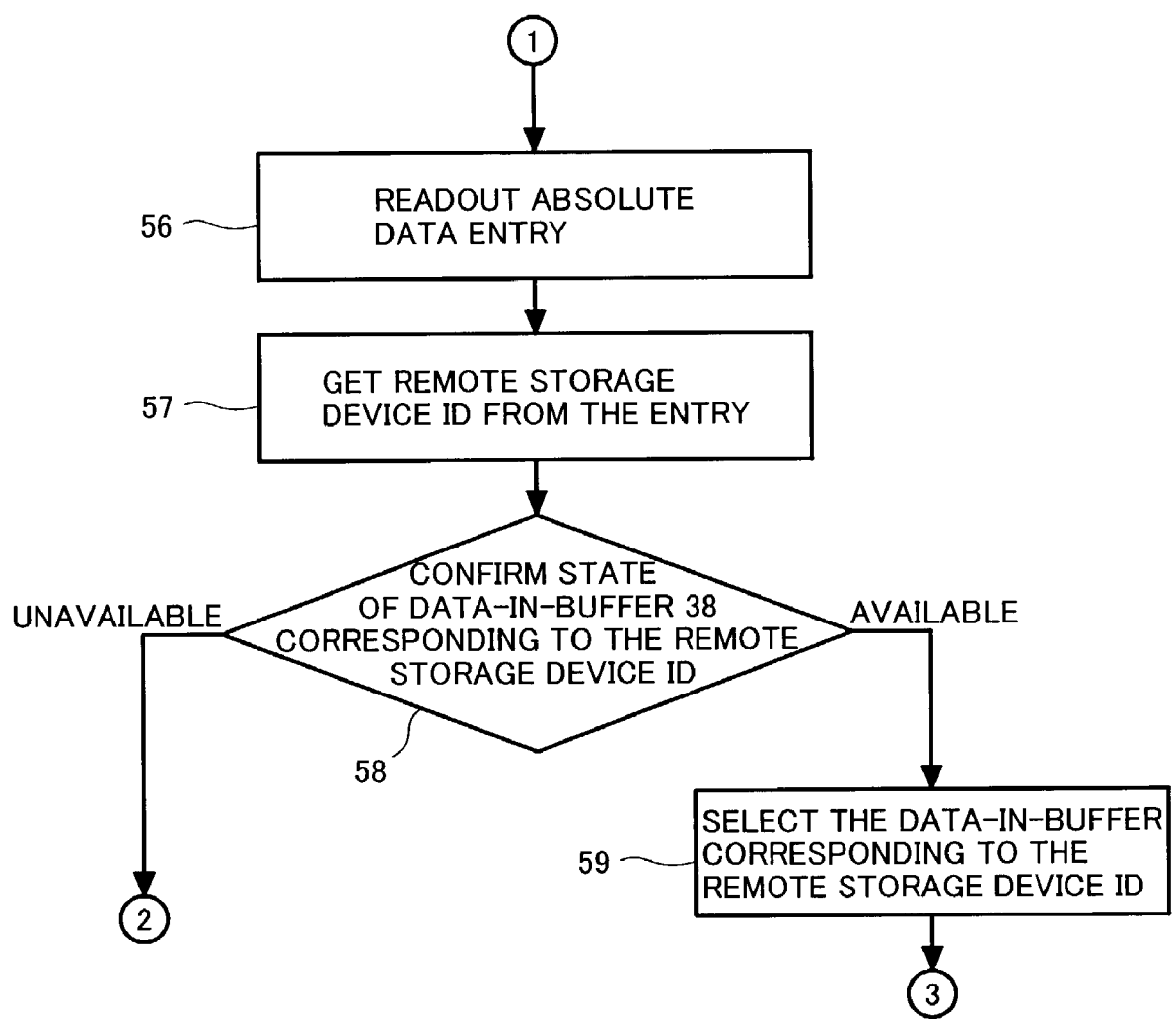
FIG. 9 is a flowchart (2) showing operation of a local interface to write data.

In FIG. 9, when an entry (called an old entry hereinbelow) having the logical unit number and the logical address of the write data notified from the host interface 12 exists in the local management table 42, the processor 34 preferentially select, as the data transfer destination, a transfer destination remote storage device described in the old entry (56 to 59) for the following reasons. If the data is transferred to a remote storage device other than that described in the old entry, a plurality of data having the logical unit number and the logical address exists in the distributed storage device. When the data can be transferred to the remote storage device described in the old entry, the write data is written in the area occupied by old data before. This prevents the situation in which a plurality of data having the logical unit number and the logical address exists in the distributed storage device.

Figure 10:
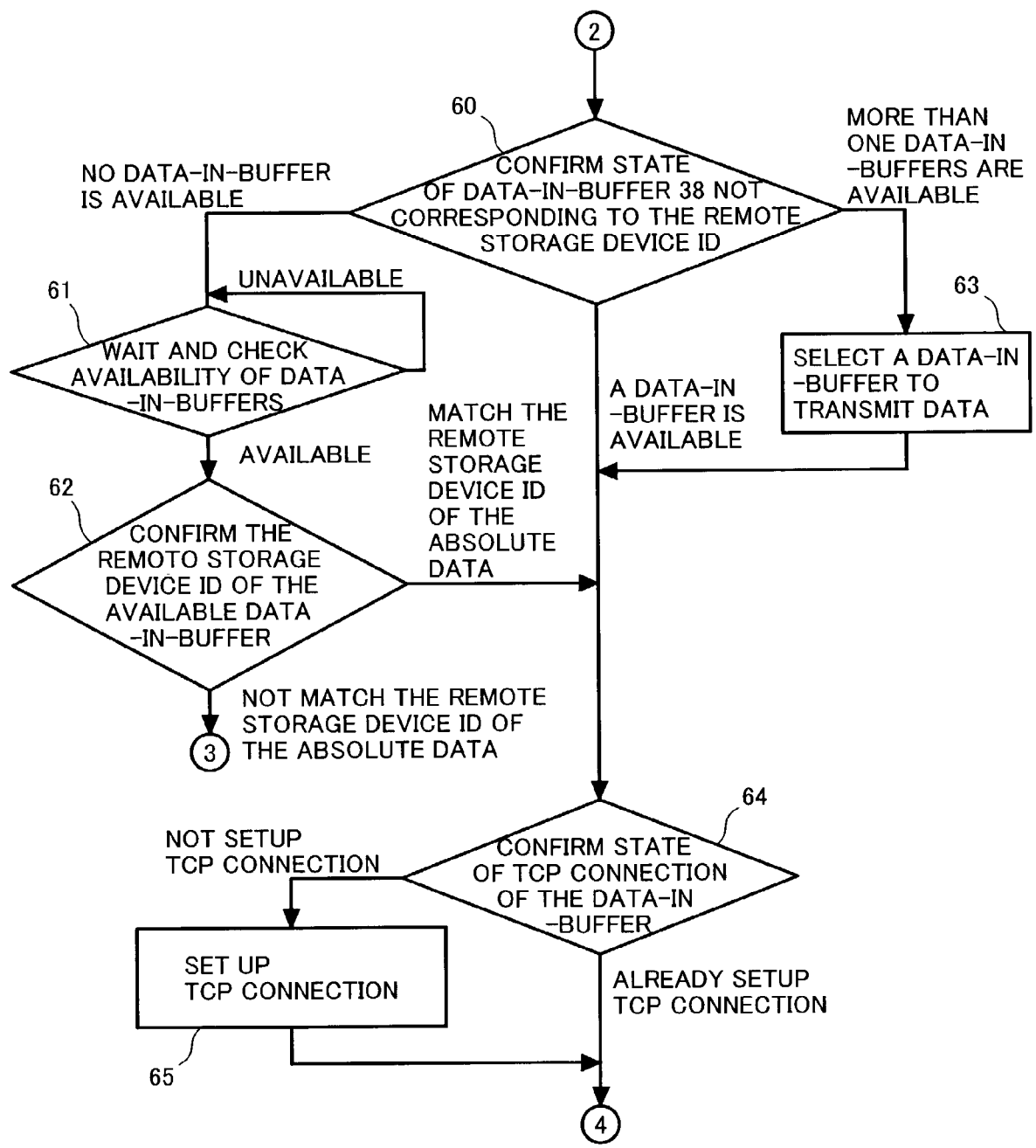
FIG. 10 is a flowchart (3) showing operation of a local interface to write data.
Figure 11:
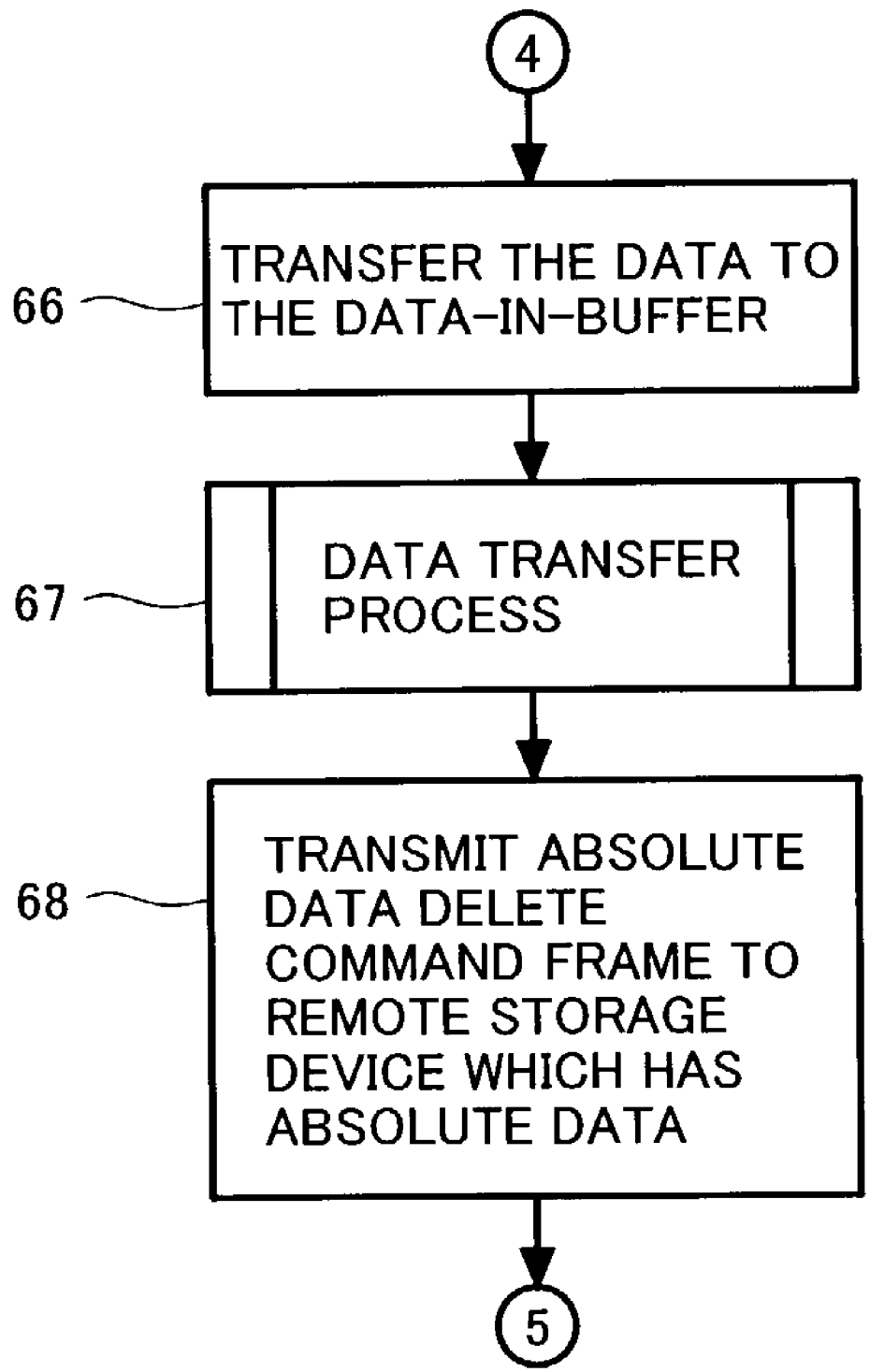
FIG. 11 is a flowchart (4) showing operation of a local interface to write data.

In FIGS. 10 and 11, when the data-in-buffer 38 corresponding to the remote storage device described in the old entry is, for example, being used by another data transmission and is hence unavailable, the processor 34 selects a data-in-buffer 38 corresponding to a remote storage device other than that described in the old entry (60 to 63). In this case, to prevent duplication of the data, the processor 34 must transfer, after the data transfer to the remote storage device other than that described in the old entry is finished, a command frame 18 to the remote storage device described in the old entry such that the data area of the logical unit and the logical address indicated by the old entry is released and the entry corresponding to the released data area is erased in the remote management table 43 (68).

When the data-in-buffer 38 is selected for transmission, the processor 34 checks the state of the TCP connection of the selected buffer 38 (50, 64). If the TCP connection has not been established, a three-directional handshake operation is conducted with the selected remote storage device to set the TCP connection (5a, 65).

After the TCP connection is set, the local storage device transfers data to the remote device (53, 67).

Figure 12:
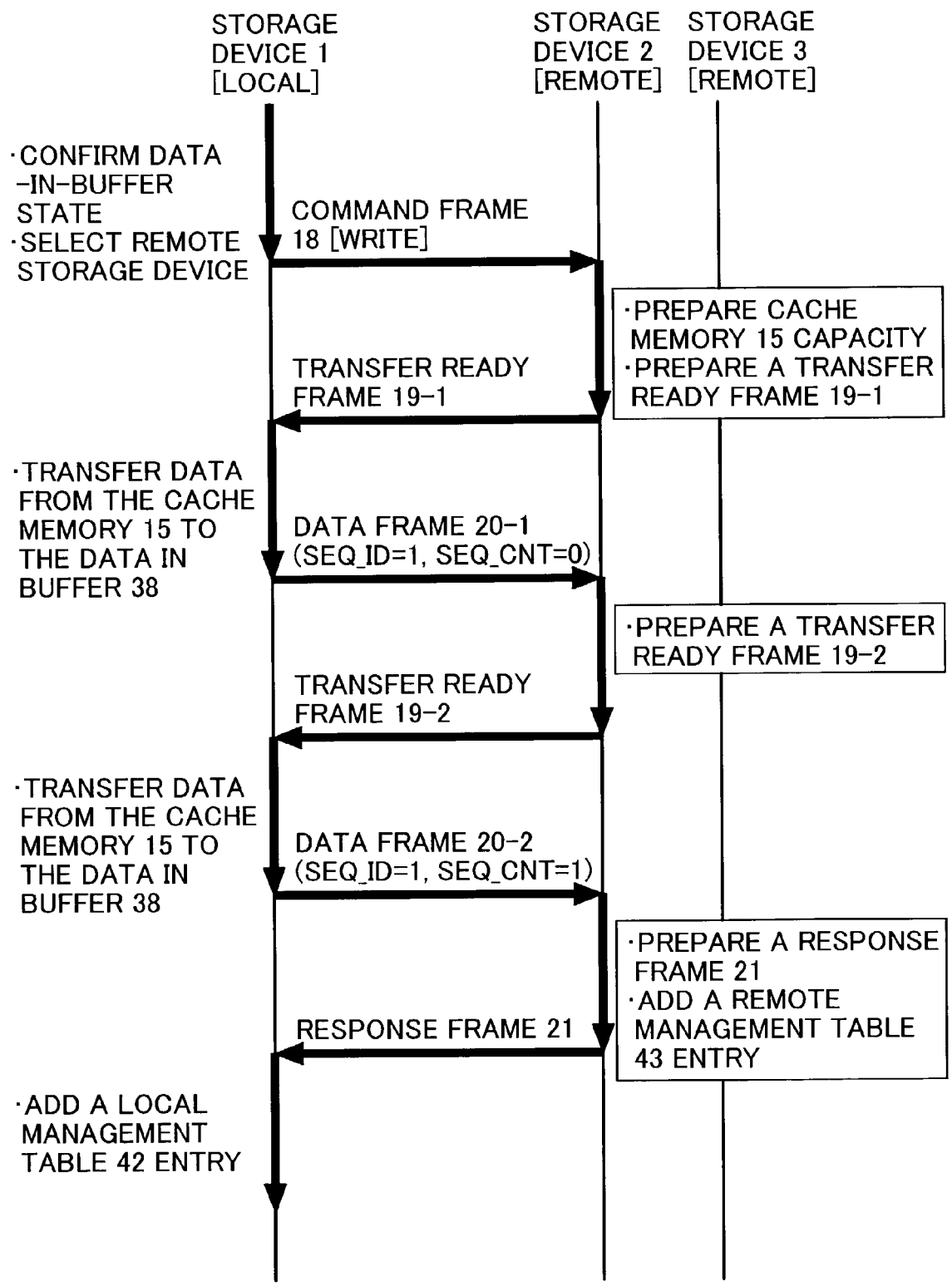
FIG. 12 is a flowchart showing operation to transfer data from a local device to a remote device.

FIG. 12 shows an example of a data write procedure between the storage device 1 and the storage device 2. It is assumed in the description that each of the frames 18 to 21 communicated between the storage devices 1 to 3 via the network 4 is processed as follows. In the data-in-buffer 38 of the storage device on the transmission side, the frame is divided into a plurality of blocks according to a maximum packet length allowed by the network 4. Thereafter, such headers as a layer-2 header, an IP header, and a TCP header are added thereto to be send as an IP packet via the network. In the data-out-buffer 40 of the storage device on the reception side, the headers including a layer-2 header, an IP header, and a TCP header are removed from the packet such that a frame is configured as a result. The IP packet communication via the network 4 is controlled according to a TCP window.

The storage device 1 sends a write command frame 18 to the storage device 2. Having received the frame 18, the storage device 2 reserves a buffer with a storage capacity necessary to receive data and then returns a transfer ready frame 19 to the storage device 1. Having received the frame 19, the storage device 1 transfers write data (data frame 20) beginning at a data write address of the cache memory 15 indicated by the host interface 12 to the selected data-in-buffer 38. The data is resultantly sent to the storage device 2.

The storage device 2 transfers the received data frame 20 to a buffer area in the cache memory 15 beforehand reserved and sends the transfer ready frame 19 to the local storage device 1 to request a next data transfer. If the received data frame is a last data frame 20 or if a reception error occurs, the storage device 2 sends a response frame 21 indicating a reception status to the storage device 1 to thereby terminate the data transfer. If a data write notification is not received from the host interface 12, the storage device 2 disconnects the TCP connection.

After the data frame 20 is written in the cache memory 15, the network interface 14 of the storage device 2 notifies to the storage controller 13 items including a logical unit number, a logical address, and a data transfer length of the write data and a cache memory area having temporarily stored the data. Having received the notification from the network interface 14, the storage controller 13 conducts various operations, for example, converts the logical unit number into a physical unit number, converts the logical address into a physical address, and reads data via the bus 16 from the cache memory 15. Finally, the storage controller 13 writes data via the data transfer channel 11 in the storage medium 17.

When the data is completely transferred to the storage device 2, the network interface 14 of the storage device 1 describes in the local management table 42 in the memory 35 an entry including an identifier of the storage device 2 as the data transfer destination, a logical unit number and a logical address of the write data, and a time stamp. The storage device 2 describes in the remote management table 43 an entry including an identifier of the storage device 1 as the data transfer source, a logical unit number and a logical address of the write data, and a time stamp.

FIGS. 6 and 7 shows configuration examples of the local management table 42 and the remote management table 43, respectively.

The example shows the local management table 42 and the remote management tables 43-1 and 43-2 when a storage device with "device identifier ID=1" writes data with "logical unit number LUN=1, logical address LA=1, time stamp TS=0" in a remote device with "device identifier ID=2" and writes data with "logical unit number LUN=1, logical address LA=3, data length L=2, data length=3, time stamp TS=1" in a remote device with "device identifier ID=3".

By the operation, the original data written from the host computer in the storage device can be stored as replica data in a remote storage device while dynamically changing an amount of transfer data depending on the state of the communication connection between the storage devices. In the example, the amount of transfer data is controlled by the TCP window. However, the amount of transfer data to each remote storage device can also be changed by using a packet to monitor the state of the network, for example, in the ATM available bit rate (ABR) service.

Figure 13:
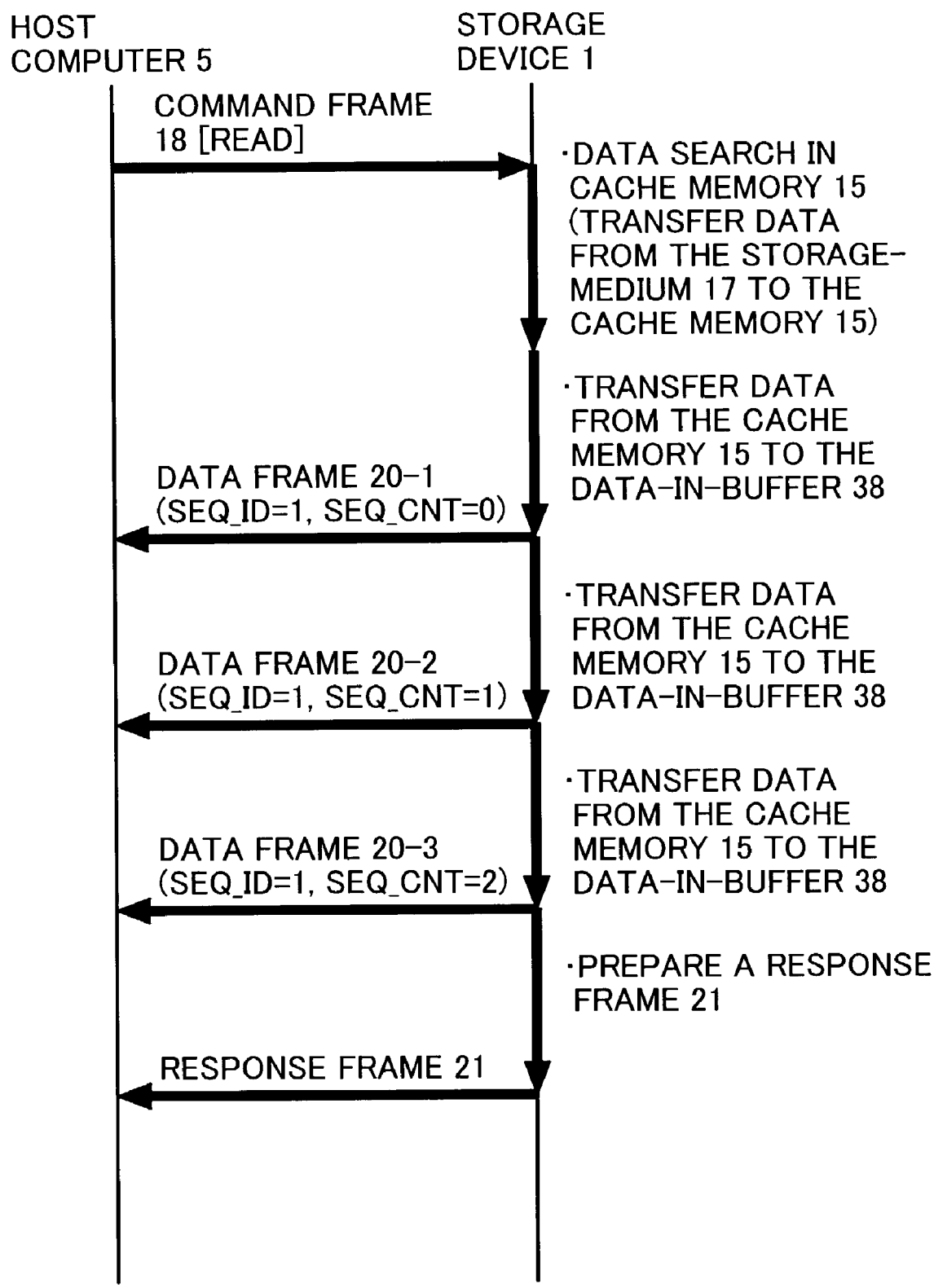
FIG. 13 is a flowchart showing operation to transfer data from a host computer to a storage device.

FIG. 13 shows an example of a data read procedure between a host computer and a storage device. Having received the data read command frame from the host computer 5, the storage device 1 makes a search through the cache memory 15 to determine whether or not the data requested by the host computer 5 is present in the memory 15. If the data is present therein, the storage device 1 reads the data from the memory 15 adds a frame header to the data and then sends a data frame 20 including the data to the host computer 5. If the data is absent, the storage device 1 transfers the data from the storage medium 17 via the storage controller 13 to the cache memory 15. The storage device 1 sends the data frame 20 to the host computer A in a procedure similar to that described above. When the frame 20 is completely transmitted, the storage device 1 sends a response frame 32 including a state of the data frame transmission to the host computer A to thereby terminates the data read operation.

Each of the storage devices 1 to 3 of the distributed storage system reads, when a failure occurs on a storage medium thereof, replica data beforehand stored as backup data in another storage device to restore the original data written on the failed storage medium from the host computer. Simultaneously, the storage device instructs another storage device such that the replica data written on the failed storage medium is again copied as backup data.

Figure 14:
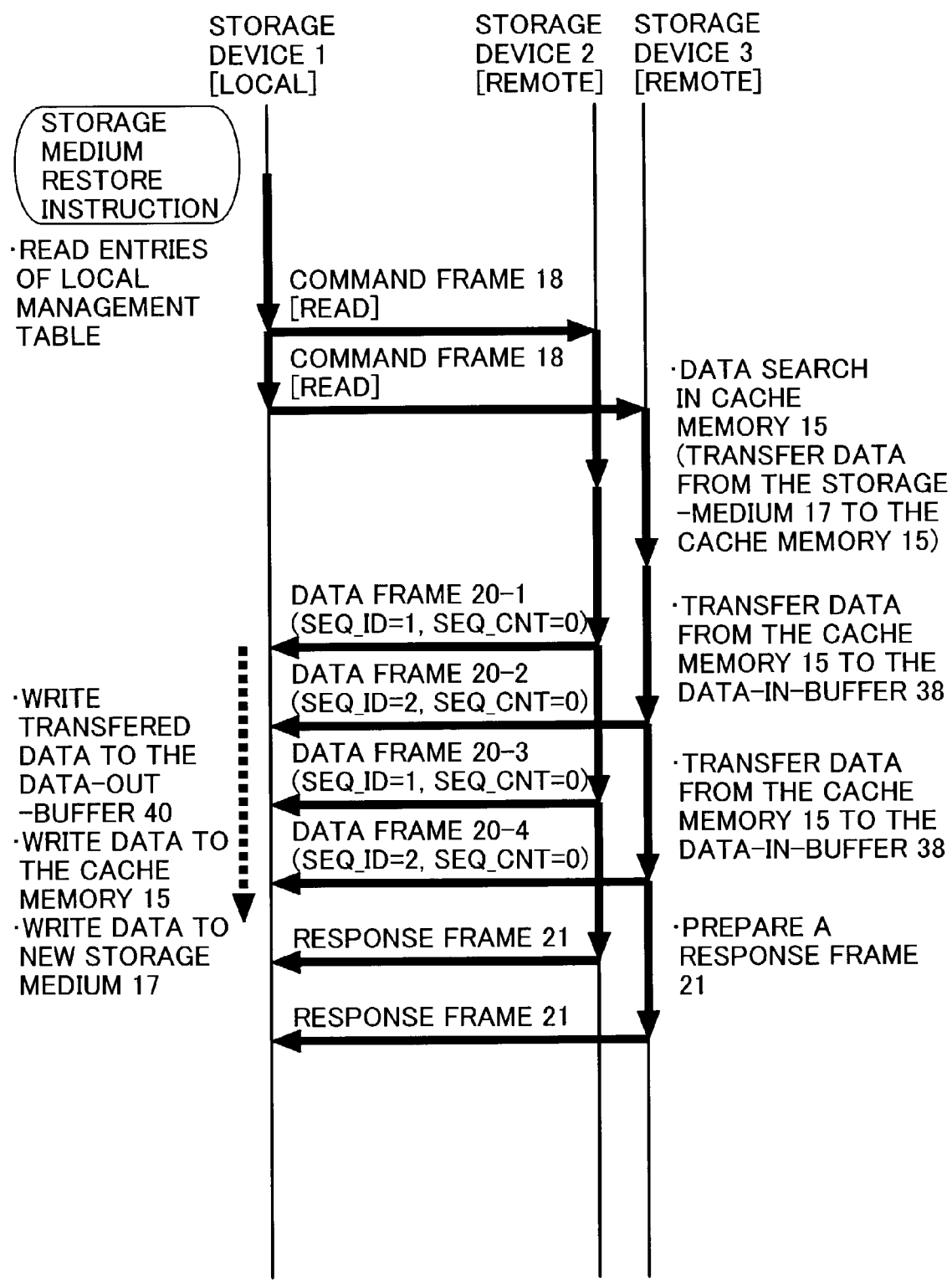
FIG. 14 is a flowchart showing operation to restore original data at failure of a recording or storage medium.

FIG. 14 shows a procedure in which the storage device 1 of which a failure occurs on the storage medium 17 reads the replica data beforehand stored as backup data on the storage devices 2 and 3 and restores the original data written on the failed storage medium 17. Using the conversion table between the logical unit number and the physical unit number and between the logical address and the physical address and the local management table which are managed by the storage interface 13, the storage device 1 identifies a backup destination of the original data written on the failed storage medium 17 and sends a replica data readout command frame 18 to the storage devices 2 and 3.

Having received the frame 18, each of the storage devices 2 and 3 makes a search through the cache memory 15 to determine whether or not the requested data is present therein. If the data is present in the memory 15, the storage device reads the data from the memory 15 and sends a data frame 20 including the data to the storage device 1 associated with the failed storage medium. If the data is absent, the storage device transfers the data from the storage medium 17 via the storage controller 13 to the cache memory 15 and then sends the data frame 20 to the storage device 1. Having received the data transferred from the storage device 2 and 3, the device 1 writes the data via the cache memory 15 and the storage interface 13 on the storage device 17 for the recovery thereof.

By repeatedly conducting the procedure for each original data written on the failed storage medium 17, the storage device 1 can restore the original data written on the failed storage medium. If a data readout request is issued from the host computer 5 to the failed storage medium 17 before the medium 17 is completely restored, the storage device 1 can naturally read the replica data of the requested data from the remote storage devices 2 and 3.

Figure 15:
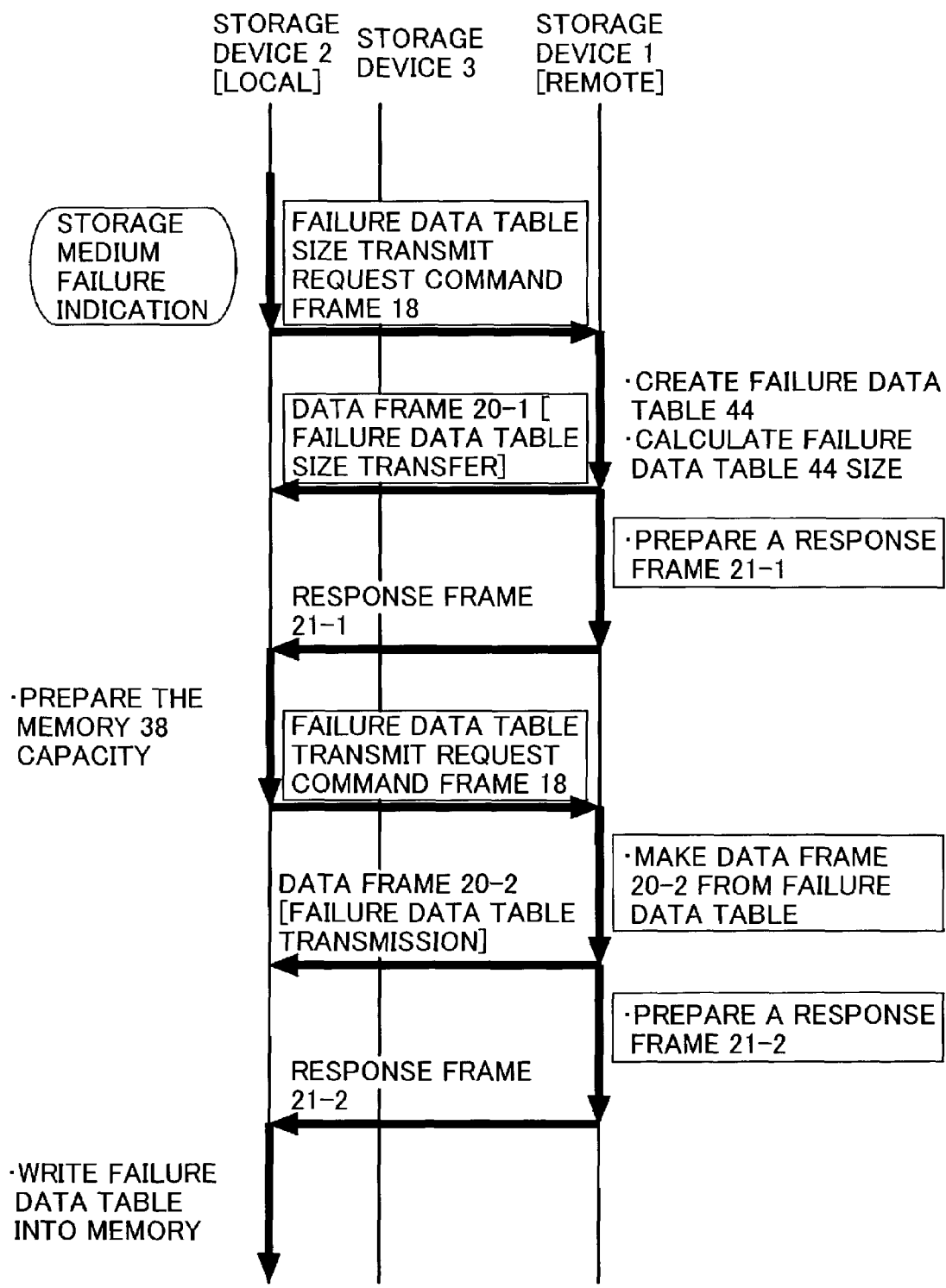
FIG. 15 is a flowchart showing operation to transfer a failure data table to backup replica data at failure of a storage medium.
Figure 16:
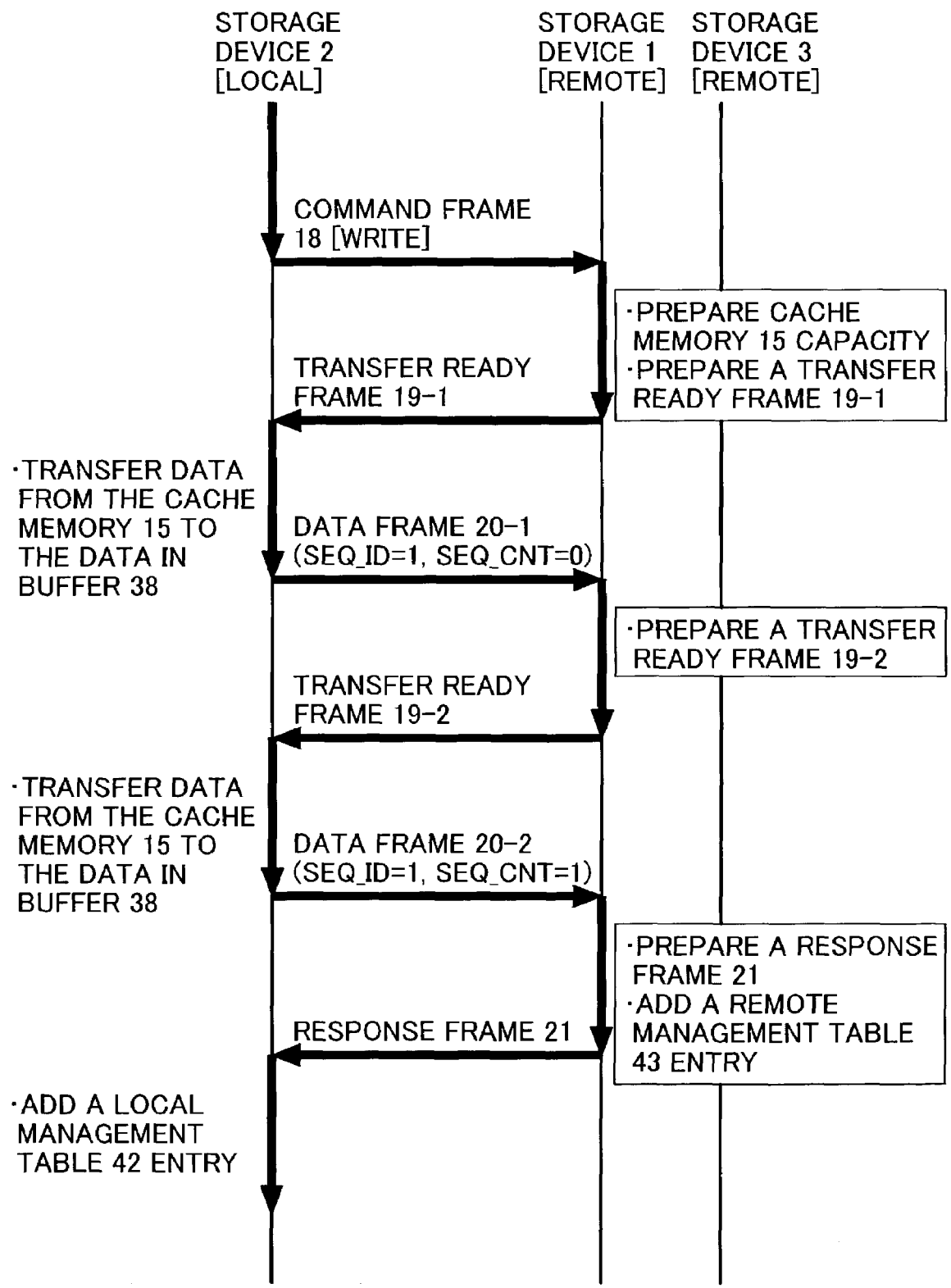
FIG. 16 is a flowchart showing operation to transfer data to backup replica data at failure of a storage medium.

FIGS. 15 and 16 shows a procedure in which the replica data written on the failed storage medium of the storage device 1 is again produced as backup data using the storage device 2. FIG. 15 shows an example of a procedure to transfer a failure data table from the storage device 1 to the storage device 2. The storage device 1 of which the storage medium fails produces a failure data table 44 as a list of replica data written from the storage device 2 onto the failed storage medium 17.

FIG. 17 shows an example of the failure data table 44. The storage device 2 which writes replica data in the storage device 1 requests the storage device 1 to notify a table size of the failure data table 44 including a list of data written on the failed storage medium. Having received the table size notification, the storage device 1 accesses the conversion table between the logical unit number and the physical unit number and between the logical address and the physical address and the remote management table 43 which are managed by the storage interface 13 and then produces a failure data table 44 as a list of replica data written from the storage device 2 onto the failed storage medium of the storage device 1. The storage device 1 then sends a data frame 31 including the table size of the failure data table and a response frame 21 to the storage device 2. Having received the data frame 44 including the table size of the failure data table 44, the storage device 2 reserves in the memory 35 of the network interface 14 a memory having a capacity to write the failure data table and then sends a transfer request command frame 18 for the failure data table 44 to the storage device 1. On receiving the frame 18 for the table 44, the storage device 1 sends a data frame 20 including the failure data table 44 and a response frame 21 to the storage device 2. Having received a data frame 31 including the failure data table 44, the storage device 2 writes the table 44 in a memory 31 of the network interface 14. The storage device 2 then makes a search through the cache memory 35 to determine whether or not data associated with the logical unit number and the logical address indicated by any entry of the failure data table 44 is present therein. If the data is present in the memory 35, the storage device 2 reads the data from the memory 35 and then copies the data as backup data on the storage devices 1 and 3 as remote storage devices of the storage device 2 in a data transfer procedure shown in FIG. 12. If the data is absent, the storage device 2 transfers the data via the storage interface 13 to the cache memory 35 and then sends a data frame 31 to the storage device 1 or 3 in a procedure similar to that described above. In this operation, the remote storage as the data transfer destination need not be the storage device 1 of which the storage medium fails. It is to be appreciated that the storage device 3 can be similarly used to again produce replica data as the backup data written on the failed storage medium of the storage device 1.

When the system operation is interrupted by a failure in any one of the storage devices 1 to 3 of the distributed storage system or when a predetermined instruction is received from the system manager, either one of the normal storage devices which is beforehand registered as a master storage device reads the replica data beforehand stored by the failed storage device as backup data on another storage device to thereby restore the original data.

Figure 18:
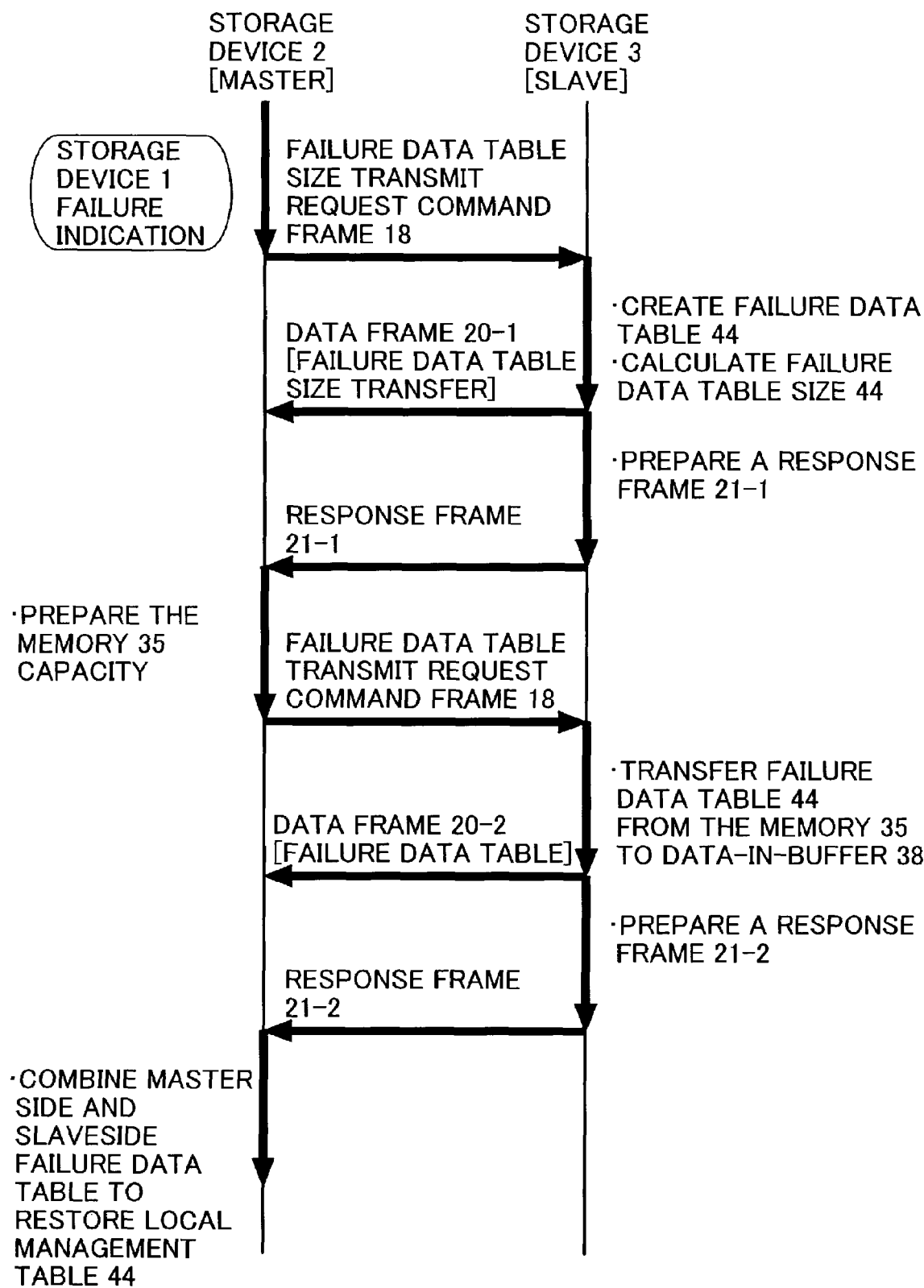
FIG. 18 is a flowchart showing operation to transfer a failure data table to restore original data at failure of a storage device.
Figure 19:
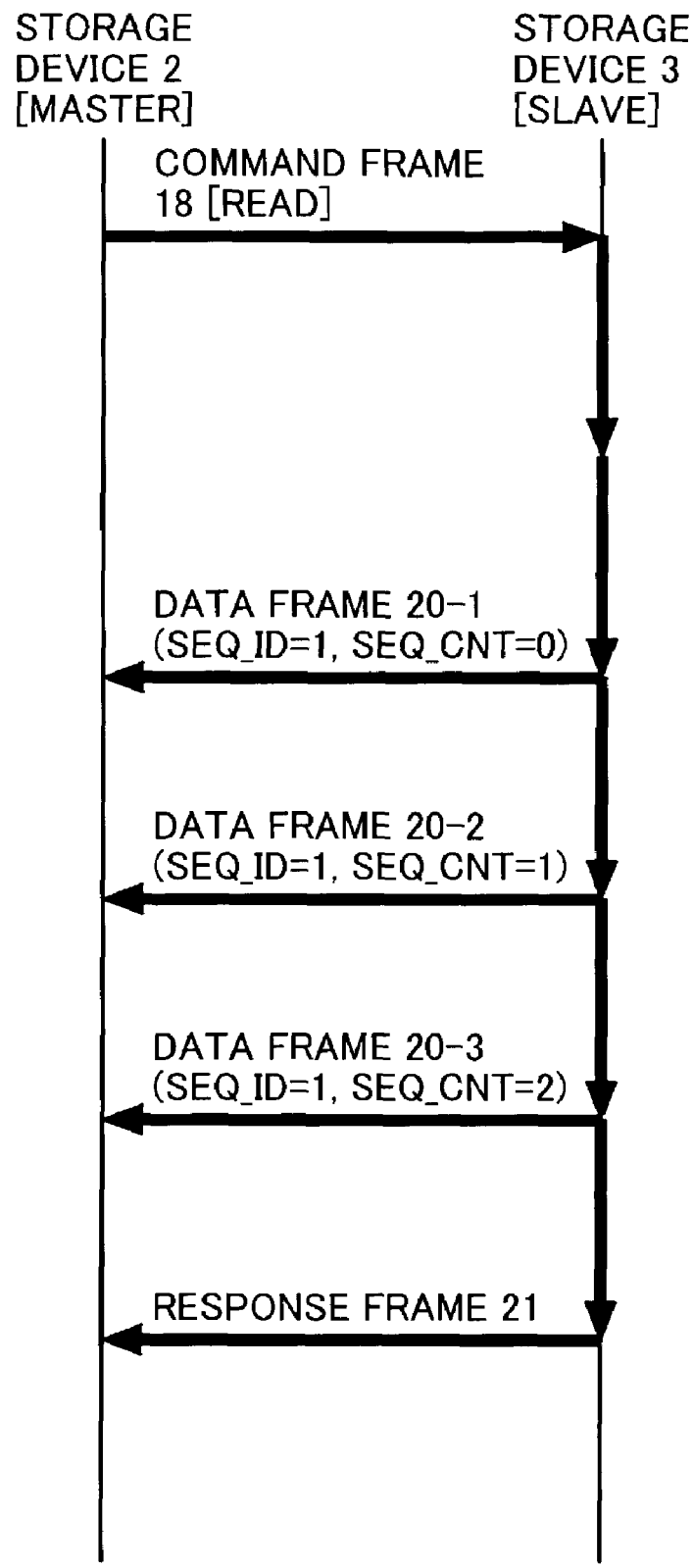
FIG. 19 is a flowchart showing operation to transfer data to restore original data at failure of a storage device.

FIGS. 18 and 19 shows an example of operation conducted between the storage devices 2 and 3 at occurrence of a failure in the storage device 1. When the storage device 1 fails, the distributed storage system sets a predetermined remote storage device 2 as a master storage device and any other storage device (only the storage device 3 in FIGS. 14 and 15) to a slave storage device to restore the original data. Having received a failure notification of the storage device 1, the storage device 2 as the master device accesses the remote management table 43 to generate therefrom a failure data table 44 as a lit of replica data written from the storage device 1 in the storage device 2. The storage device 2 sends a command frame 18 for a table size transfer to the storage device 3 as the slave device to send a table size of the failure data table 4 as a list of replica data written from the storage device 1 in the storage device 3. Having received the command frame 18, the storage device 3 accesses the remote management table 43 to generated therefrom a failure data table 44 as a lit of replica data written from the storage device 1 in the storage device 3. The storage device 3 then sends a data frame 20 including the size of the generated table 44 and a response frame 21 to the storage device 2. On receiving the data frame 20 including the table size of the failure data table 44 from the storage device 3, the storage device 2 reserves in the memory 35 of the network interface an area of a capacity to store the failure data table 44 of the storage device 3 and then sends a transfer request command frame 18 to the storage device 3 to transfer the failure table 44. Having received the command frame 18, the storage device 3 sends a data frame including the failure data table 44 and a response frame 21 to the storage device 2. On receiving the data frame 20, the storage device 2 combines a failure data table 44 of the storage device 2 with the failure data table 44 from the storage device 3 to thereby restore a local management table 44 kept by the failed storage device 1. In the operation to combine the local management tables with each other, if a logical unit number and a logical address of an entry of the failure data table 44 of the storage device 2 are equal to those of an entry of the failure data table 44 from the storage device 3, a time stamp of the table 44 of the storage device 2 is compared with that of the table 44 from the storage device 3 to select an entry with a younger time stamp. This resultantly prevents duplication of data. The state in which a logical unit number and a logical address of an entry of the failure data table 44 of the storage device 2 are equal to those of an entry of the failure data table 44 from the storage device 3 occurs, for example, when the storage device 1 is abruptly stopped and hence an entry erase command frame 18 is not normally transmitted. According to the combined local management table 44, the storage device 2 as the master device restores the original data kept in the storage device 1 using the replica data read from the storage device and the replica data kept in the storage device 2.

Finally, when the restoration of the original data takes place in response to a storage failure, not a predetermined command from the system manager, the storage device as the master copies again as backup data the replica data of the storage device 1 kept by the storage device 2 onto each storage device (only the storage device 3 in the embodiment) according to a procedure similar to that shown in FIG. 9. By the operation, the storage device 2 and the host computer 7 can resume the data processing in place of the storage device 1 and the host computer 5 which are interrupted by the failure.

According to the embodiment, the data backup operation and the data restoration can be achieved at a high speed.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A distributed storage system including:
   a network;
   a plurality of host computers; and
   a plurality of storage devices each connected to at least a respective one of the host computers, each of the storage devices being connected via the network to at least two other storage devices which are also connected via the network, distributedly backing-up a copy of replica data of data stored in said each storage device to the at least two other storage devices by dynamically changing an amount of data to-be-transferred from said each storage device to one of the at least two other storage devices depending upon a state of communication connection therebetween when said each storage device operates normally, and selecting at least one of the at least two other storage devices to access the replica data when said each storage device fails,
   wherein the respective host computer dynamically selects and accesses one of the storages according to a state of communication connections on the network,
   wherein each of the storage devices includes:
   a storage unit for recording data;
   a host interface connected to the respective host computer;
   a network interface connected to the network;
   a storage controller connected to the storage unit; and
   a bus for connecting the host interface, the network interface, and the storage controller to one another, and
   wherein the network interface of each of the storage devices includes:
   a processor for controlling a communication connection via the network to the at least two other storage devices as dynamically selected;
   a memory for keeping a local management table controlling data transferred therefrom to the at least two other storage devices and a remote management table controlling data transferred from said each storage device thereinto;
   a frame sender for sending replica data of data stored in said storage device to the at least two other storage devices to back-up the replica data in the at least two other storage devices; and
   a frame receiver for receiving the replica data back from the at least two other storage devices.

2. A distributed storage system according to claim 1, wherein the state of communication connections on the network is identified using a packet monitoring a state of the network.

3. A distributed storage system according to claim 1, wherein the memory further includes a failure data table for restoring failed data at occurrence of a failure.

4. A distributed storage system according to claim 3, wherein the frame sender includes a data-in-buffer to transmit a data frame for each communication connection with said another storage device.

5. A distributed storage system according to claim 4, wherein the processor identifies the state of communication connections on the network according to a state of the data-in-buffer.

6. A distributed storage system according to claim 5, wherein the frame sender includes a command-in-buffer to transmit a control frame.

7. A distributed storage system according to claim 1, wherein a notification-reply processing is executed by at least one of the storage devices functioning as a constituent component of said distributed storage system which notifies the at least two other storage devices of the distributed storage system, and
   said the at least two other storage devices register therein said at least one of the storage device as the constituent component of the distributed storage system, and then returns a reply of registration completion to said at least one of the storage device, respectively.

8. A distributed storage system according to claim 7, wherein the notification-reply processing is periodically executed at a fixed interval of time.

9. A distributed storage system according to claim 1, wherein the state of communication connection among the storage devices is determined using packet monitoring and controlled by a transmission control protocol (TCP).

10. A distributed storage system according to claim 9, wherein said each storage device includes a data buffer to send or receive a data frame for each communication connection from the other storage devices, and said each storage device determines the state of communication connection according to a state of the data buffer.

11. A distributed storage system according to claim 10, wherein that data is preferentially transferred to or from a data buffer having a larger unused area or a higher transmission rate.

12. A distributed storage system according to claim 9, wherein the packet monitoring uses ATM available bit rate (ABR).

13. A distributed storage system according to claim 1, wherein the distributed storage system is a RAID system, one copy of replica data of data stored in said each storage device to each of the at least two other storage devices, and said frame sender sends replica data of data stored in said storage device to each of the at least two other storage devices to back-up the replica data in each of the at least two other storage devices.

14. A distributed storage system according to claim 1, wherein when said each storage device fails,
   said each storage device selects one of the at least two other storage devices as a master storage device and each of the remaining one as a slave storage device, and
   the master storage device notifies each slave storage device to forward information contained in the remote management table thereof to the master storage device to be combined with in the remote management table thereof to restore the original data.

15. A storage device connected via a network to at least two other storage devices which are also connected via the network to mutually access each other, each of the storage devices comprising:
   a storage unit for recording data;
   a host interface connected to a host computer;
   a network interface connected to the network;
   a storage controller connected to the storage unit; and
   a bus for connecting the host interface, the network interface, and the storage controller to one another,
   wherein the storage device distributedly backs-up a copy of replica data of data stored therein to the at least two other storage devices by dynamically changing an amount of data to-be-transferred from said each storage device to one of the at least two other storage devices depending upon a state of communication connection therebetween when said each storage device operates normally, and selects at least one of the at least two other storage devices to access the replica data when said each storage device fails, and wherein the network interface of the storage device includes:

a processor for controlling a communication connection via the network to the at least two other storage devices;

a memory for keeping a local management table controlling data transferred therefrom to the at least two other storage devices and a remote management table controlling data transferred from said each storage device thereinto;

a frame sender for sending replica data of data stored in said storage device to the at least two other storage devices to back-up the replica data in the at least two other storage devices; and a frame receiver for receiving the replica data back from s the at least two other storage devices.

16. A distributed storage system according to claim 15, wherein the state of communication connections on the network is identified using a packet monitoring a state of the network.

17. A distributed storage system according to claim 16, wherein the memory further includes a failure data table for restoring failed data at occurrence of a failure.

18. A distributed storage system according to claim 17, wherein the frame sender includes a data-in-buffer to transmit a data frame for each communication connection with said another storage device.

19. A distributed storage system according to claim 18, wherein the processor identifies the state of communication connections on the network according to a state of the data-in-buffer.

20. A distributed storage system according to claim 19, wherein the frame sender includes a command-in-buffer to transmit a control frame.

21. A method of copying and restoring data comprising:

providing a plurality of storage devices connected via a network to one another, and each of the storage devices being connected to at least a respective host computer, each of the storage devices being connected to at least two other storage devices, distributedly backing-up a copy of replica data of data stored in said each storage device to the at least two other storage devices by dynamically changing an amount of data to-be-transferred from said each storage device to one of the at least two other storage devices depending upon a state of communication connection therebetween when said each storage device operates normally, and selecting at least one of the at least two other storage devices to access the replica data when said each storage device fails, each of the storage devices including: a storage unit for recording data; a host interface connected to the respective host computer; a network interface connected to the network; a storage controller connected to the storage unit; and a bus for connecting the host interface, the network interface, and the storage controller to one another, wherein the network interface of each the storage device including: a processor for controlling a communication connection via the network to at least two other storage devices as dynamically selected; a memory for keeping a remote management table controlling data transferred from the at least two other storage devices; a frame sender for sending replica data to the at least two other storage devices; and a frame receiver for receiving the replica data back from the at least two other storage devices;

backing-up a copy of data in one of the storage devices into the at least two other storage devices which are dynamically selected according to a state of communication connections on the network;

keeping a local management table thereby controlling data transferred therefrom to the at least two other storage devices and keeping a remote management table thereby controlling data transferred from said each storage device thereinto; and receiving by said one storage device the copy of data back from the at least two other storage devices.

22. A method of copying data according to claim 21, further comprising identifying the state of communication connections on the network using a packet monitoring a state of the network.

23. A method of copying data according to claim 21, further comprising:

transmitting by a data-in-buffer of the storage device a data frame for each communication connection with the other storage devices; and identifying the state of communication connections on the network according to a state of the data-in-buffer.

* * * * *